Figure 4:
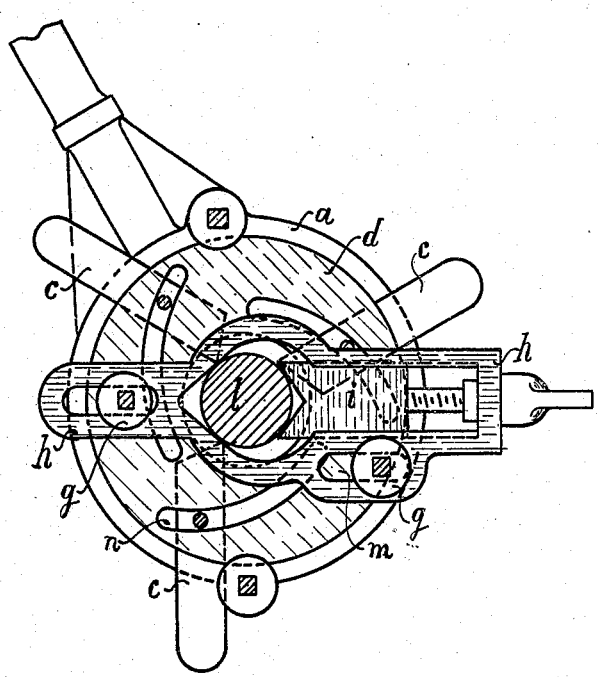

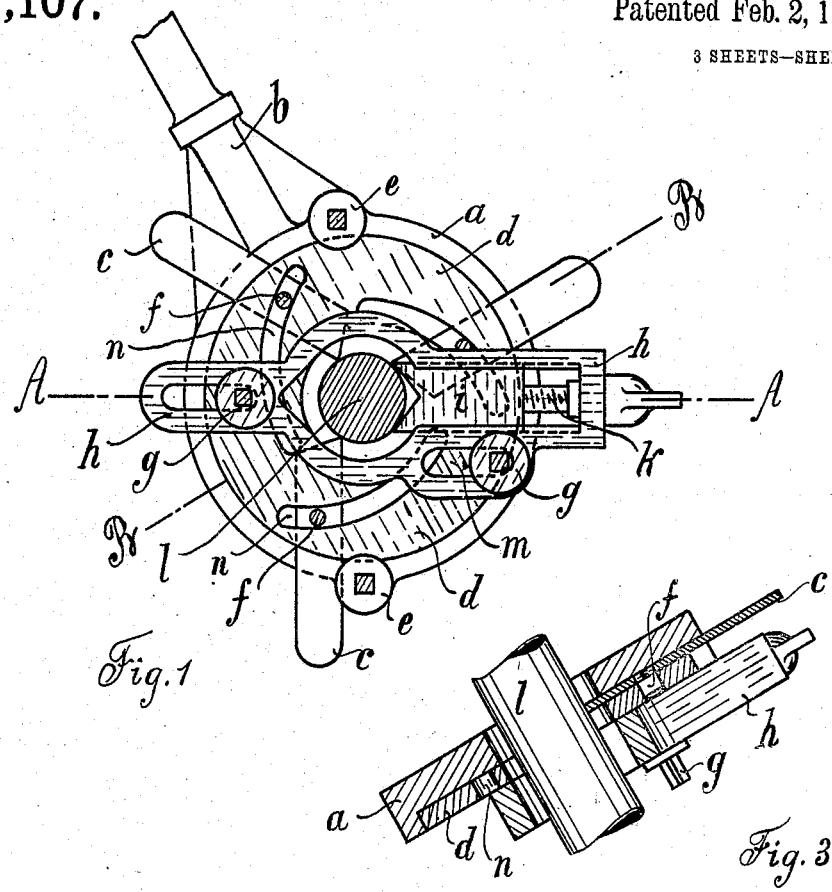
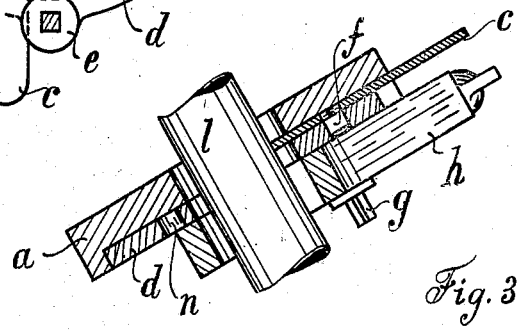
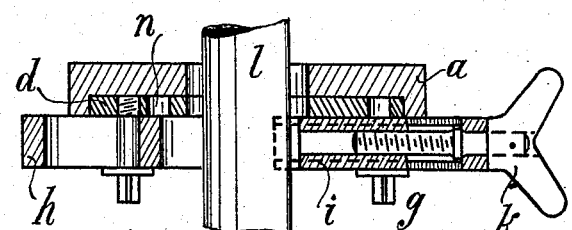

R. BARTHOLOMÄUS.
CUTTING MECHANISM FOR TUBES AND RODS.
APPLICATION FILED JAN. 14, 1908.

911,107.

Patented Feb. 2, 1909.

3 SHEETS—SHEET 2.

Witnesses

Inventor
Rudolf Bartholomäus
Herbert Sefton Jones
Attorney

R. BARTHOLOMÄUS.
CUTTING MECHANISM FOR TUBES AND RODS.
APPLICATION FILED JAN. 14, 1908.

911,107.

Patented Feb. 2, 1909.

3 SHEETS—SHEET 3.

Witnesses
Walter G. Pool
John A. Jordan

Inventor
Rudolf Bartholomäus
per: Herbert Sefton Jones
Attorney.

UNITED STATES PATENT OFFICE.

RUDOLF BARTHOLOMÄUS, OF DRESDEN, GERMANY, ASSIGNOR OF ONE-HALF TO HENRY HORNUNG PETIT, OF DRESDEN, GERMANY.

CUTTING MECHANISM FOR TUBES AND RODS.

No. 911,107. Specification of Letters Patent. Patented Feb. 2, 1909.

Application filed January 14, 1908. Serial No. 410,802.

*To all whom it may concern:*

Be it known that I, RUDOLF BARTHOLOMÄUS, a subject of the Emperor of Germany, residing at 66 Reissigerstrasse, Dresden, in the State of Saxony, German Empire, have invented a new and useful Improvement in Cutting Mechanism for Tubes and Rods, of which the following is a specification.

This invention relates to an apparatus for cutting up tubes and rods which possesses blades radially adjustable in a tool holder, which blades are advanced by the turning of a cam disk placed rotatably upon the tool holder. Similar devices are already known.

The invention consists in a device for the automatic advance of the blades by means of the friction between the work itself and a revolving organ of the advancing mechanism.

The new cutting mechanism is illustrated in the drawing in four figures.

Figure 5:
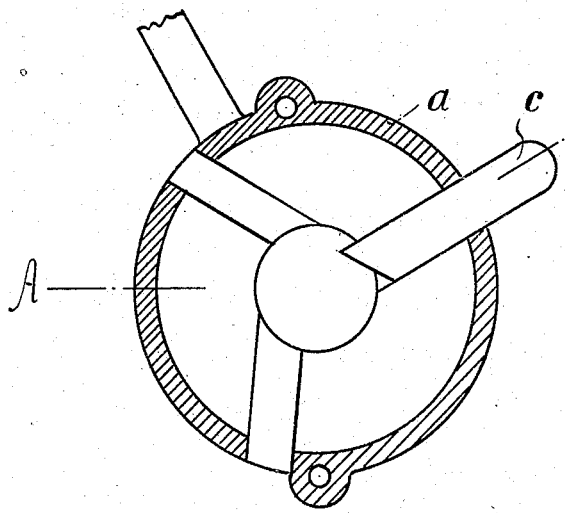
Figure 7:
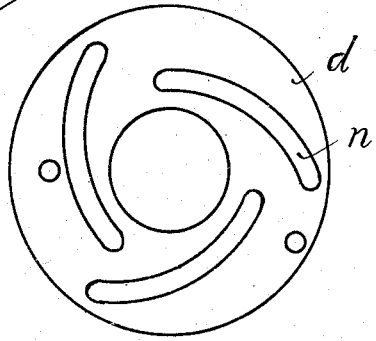
Figure 6:
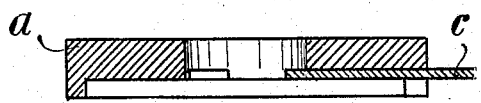
Figure 8:
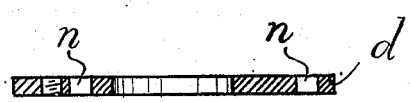

Figures 1 to 3 show the cutting tool with the work inserted through it but not firmly gripped, and of these Fig. 1 shows a front elevation. Fig. 2 a section on the line A—A of Fig. 1, and Fig. 3 a section on the line B—B of Fig. 1. Fig. 4 shows a front elevation corresponding to Fig. 1 with the work grasped for cutting. Fig. 5 shows an elevation of the tool holder $a$ with one cutter $c$ inserted. Fig. 6 shows a section thereof on the line A—B. Fig. 7 shows an elevation of the slotted disk $d$. Fig. 8 shows a horizontal section through the center of Fig. 7.

The tool holder $a$ is provided with a handle $b$, and a circular cavity in which a cam disk $d$ is revolubly supported. This cam disk is prevented from falling out of the holder $a$ by means of the screws $e$, which are screwed into the holder $a$ and the heads of which project over the cam disk $d$. The tool holder $a$ possesses moreover several radial slots which are so deep that between the cam disk $d$ and the bottom of the circular cavity each blade $c$ can be loosely inserted. These blades $c$ are prevented by the slots from turning, and can only move radially to and fro in the said slots. The cam disk likewise contains curved eccentric or cam slots $n$ corresponding in number to the number of the blades and destined for them. In these slots engage the pins $f$ attached to the blades. In consequence of this arrangement a uniform advance of the blades in the well known manner is effected by turning the cam disk $d$. With the cam disk $d$ there is connected, by screws $g$, the part $h$, which effects the automatic advance of the blades $c$. The screws $g$ are passed through slots in the piece $h$, so that these latter can be moved upon the cam disk $d$. The part $h$ consists of a casing in which there is arranged a brake block $i$ adjustable radially. The adjustment of the brake block $i$ takes place in the present constructional example, by means of a wing screw $k$.

The operation of the device is as follows: The apparatus is first placed concentrically over the tube or rod to be cut off, which in the present instance is shown as a round bar $l$ clamped between the centers of a lathe. Hereupon the part $h$ is moved to the right until its surface opposed to the brake block $i$ rests against the work $l$. Hereupon by means of the wing screw $k$ the brake block $i$ is screwed down upon the bar, and is pressed upon it so firmly, that the cutter can only just be turned by aid of the handle $b$. The lathe is then set going, and the cutter is held fast by means of its handle $b$. The friction between the bar $l$ and the brake block $i$ causes the latter to revolve so that the casing $h$ and the cam disk $d$ connected therewith at the commencement turn with it. By means of this turning of the cam disk $d$ the blades $c$ are advanced against the work and are caused to cut. As soon as the cutting resistance has become greater than the frictional resistance between the brake block and the work, the action of the brake block ceases and consequently the turning of the cam disk, but is each time again renewed as soon as the cutting resistance has decreased. Consequently the blades are automatically and permanently advanced until the work is cut through. The same action as in the case of a rod or tube turning while the cutting device is held fast, also takes place if the work is held fast by being clamped in the lathe and the cutting device on the other hand is caused by hand or machine power to revolve about it. In like manner, the device according to the present invention can also be applied in special lathes, as for instance in cutting-off machinery and the like in such a manner as to form a portion of the machine. In order moreover to render possible also the cutting off of non-circular articles by means of the cutting device, the wing screw $k$ may be replaced by a strong spring, which presses the brake block $i$ continuously on the surface of the work and thereby maintains continuously the frictional pressure. The entire device has the further advantage that the part *h* applying itself from one side against the work and the brake block *i* applying itself from the other side form together a wide support for the work, and consequently render impossible the inclination of the cutting device in regard to the work.

What I claim is:

1. A self-adjusting cutting mechanism for tubes and rods comprising in combination, a tool holder, movable cutters in said tool holder, a cam disk operatively connected to said cutters, a casing adjustably attached to said tool holder, and a brake block connected to said cam disk and adapted to press against the work and thereby turn the casing and the cam disk and advance the cutters against the work.

2. A self-adjusting cutting mechanism for tubes and rods comprising in combination, a tool holder adapted for manual guidance, a plurality of cutter blades radially adjustable in said tool holder, a revoluble eccentrically slotted cam disk secured in said tool holder, projections on said cutter blades adapted to engage in the curved eccentric slots of the said cam disk, a casing connected to the cam disk, a radially adjustable brake block in said casing, and means for adjusting the friction of the brake from the work so as periodically to advance the cam disk and tighten the cutters in proportion as the cutting progresses.

3. A self-adjusting cutting mechanism for tubes and rods comprising in combination, a tool holder adapted for manual guidance, a plurality of cutter blades *c*, the eccentrically slotted cam disk *d* controlling said blades, the pins *f* secured to the blades *c* and passing through the curved eccentric slots in the cam disk, the casing *h*, the brake block *i* within said casing, and means for pressing the block *i* against the work and causing the cam disks to advance the blades *c* forcibly and progressively against the work.

4. A self-adjusting cutting mechanism for tubes and rods comprising in combination, a tool holder, movable cutters in said tool holder, a cam disk operatively connected to said cutters, the slotted brake block *h*, and screw bolts *g* attached to the cam disks *d* and passing through the slots of the block *h* whereby adjustment of the cam disk and brake block with regard to one another and with regard to the work is effected.

In testimony whereof I have signed my name to this specification in the presence of two subscribing witnesses.

RUDOLF BARTHOLOMÄUS.

Witnesses:
PAUL ARRAS,
CLÄRE SIMON